United States Patent
Sanchez et al.

(10) Patent No.: US 6,725,101 B2
(45) Date of Patent: Apr. 20, 2004

(54) METHOD AND APPARATUS FOR USING FAST FOURIER TRANSFORM FEEDBACK TO COMPENSATE FOR NON-LINEAR MOTION

(75) Inventors: Rene E. Sanchez, Berkeley, CA (US); Joannes N. M. de Jong, Suffern, NY (US); Lloyd A. Williams, Mahopac, NY (US); Vincent M. Williams, Palmyra, NY (US); Daniel W. Costanza, Webster, NY (US)

(73) Assignee: Xerox Corporation, Stamford, CT (US)

( * ) Notice: Subject to any disclaimer, the term of this patent is extended or adjusted under 35 U.S.C. 154(b) by 590 days.

(21) Appl. No.: 09/736,520

(22) Filed: Dec. 13, 2000

(65) Prior Publication Data

US 2002/0072812 A1 Jun. 13, 2002

(51) Int. Cl.[7] ............................................... G05B 13/02
(52) U.S. Cl. ........................................ 700/45; 700/261
(58) Field of Search .................... 700/45, 261; 318/610, 318/616; 399/46; 328/127; 360/73; 381/71

(56) References Cited

U.S. PATENT DOCUMENTS

| 3,652,942 A | 3/1972 | O'Connor et al. .......... 328/127 |
| 4,490,841 A | * 12/1984 | Chaplin et al. .......... 381/71.14 |
| 4,547,858 A | * 10/1985 | Horak .......................... 700/261 |
| 4,727,303 A | 2/1988 | Morse et al. ................ 318/616 |
| 5,124,626 A | 6/1992 | Thoen .......................... 318/610 |
| 5,491,594 A | * 2/1996 | Yamamoto et al. ....... 360/73.04 |
| 5,605,097 A | * 2/1997 | Ruckl et al. .............. 101/128.4 |
| 5,950,040 A | 9/1999 | Mestha et al. ................. 399/46 |
| 6,326,758 B1 | * 12/2001 | Discenzo ..................... 318/609 |

OTHER PUBLICATIONS

Pham, Duc Truong & Liu, Xing, Neural Networks for Identification, Prediction and Control, 1995, Springer–Verlag London Limited, 1st Ed., 175–76.*

Breitfelder, Kim, and Messina, Don, IEEE 100: The Authoritative Dictionary of IEEE Standards Terms, Standards Information Network IEEE Press, 7th Ed., 879.*

* cited by examiner

Primary Examiner—Wilbert L. Starks, Jr.
Assistant Examiner—Joshua C Liu
(74) Attorney, Agent, or Firm—Perman & Green, LLP

(57) ABSTRACT

A non-linear control (NLC) system for controlling performance of a device. The NLC system comprises a controller system and a first feedback compensator connected to the controller. The first feedback compensator compensates for linear error performance of the device; the second feedback compensator compensates for non-linear error performance of the device.

2 Claims, 6 Drawing Sheets

METHOD AND APPARATUS FOR USING FAST FOURIER TRANSFORM FEEDBACK TO COMPENSATE FOR NON-LINEAR MOTION

BACKGROUND OF THE INVENTION

1. Field of the Invention

The present invention relates to document processing machines and, more particularly, to document processing machines incorporating control systems.

2. Prior Art

Various document systems require that an automatic document handling apparatus within the system operate within precision tolerances so as to align a particular edge of a document with a given coordinate. For example, in an x-y coordinate system this could be the coordinates 0,0, on a copier platen where the scanner or copier optics have also been aligned to begin imaging at the 0,0 coordinates on the copier platen. This process of aligning the document relative to a given coordinate is known as document registration. In a manual copying operation, an original document is registered by the user with ruler markings along the sides of the platen. In systems having automatic document handling systems document registration is automatic and is generally accomplished by the use of various belts, rollers and sensors situated along the document path. The precision control of the various belts and rollers along the document path is generally accomplished using classical feedback control systems. If the original document is not properly registered then undesirable dark borders and shadow images may appear on the copy. In addition to document registration other document positioning functions requiring feedback control includes photo receptive (PR) drum motion control, and intermediate belt transfer (IBT) motion control, and developer motion control. In general, the desired positioning accuracy for document handling is on the order of one millimeter. As is readily appreciated an automatic document handling system must rapidly and accurately position each document. Conventional feedback control systems correct for the undesired linear motion of the document handling systems. However, the non-linear motion due to motor torque ripple, gear run-out, and roll run-out can not always be corrected due to bandwidth limitations in the classical controller. Currently, the non-linear motion due to these errors is minimized by demanding that tolerances associated with manufactured parts be as small as possible. Achieving such tolerances are difficult and expensive to maintain.

SUMMARY OF THE INVENTION

In accordance with one embodiment of the invention, a non-linear control (NLC) system for controlling performance of a device is provided. The NLC system comprises a controller system with a first and second feedback compensator connected to the controller. The first feedback compensator compensates for linear error performance of the device while the second feedback compensator compensates for non-linear error performance of the device.

In accordance with another embodiment, the invention includes a method for controlling non-linear motion of a system. The method comprises the steps of sampling non-linear performance of the system and determining at least one frequency component of the sampled non-linear performance. Next, at least one sinusoid substantially equal in magnitude to the at least one frequency component and substantially 180 degrees phase inverted with respect to the at least one frequency component is applied to the system controller.

Another embodiment of the invention is directed towards a hybrid learning feedback controller (HLC) system for controlling operation of a xerographic imaging device; the xerographic imaging device having an input port and an output port. The HLC feedback controller system comprises a feed forward controller system operative to receive an actuating signal and in response to the actuating signal output a manipulated variable. The feed forward controller comprises a feed forward controller, a first input summing node, a second input summing node, a first proportionality device, and a second feedback compensator having a learning controller system for correcting non-linear motion of the device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
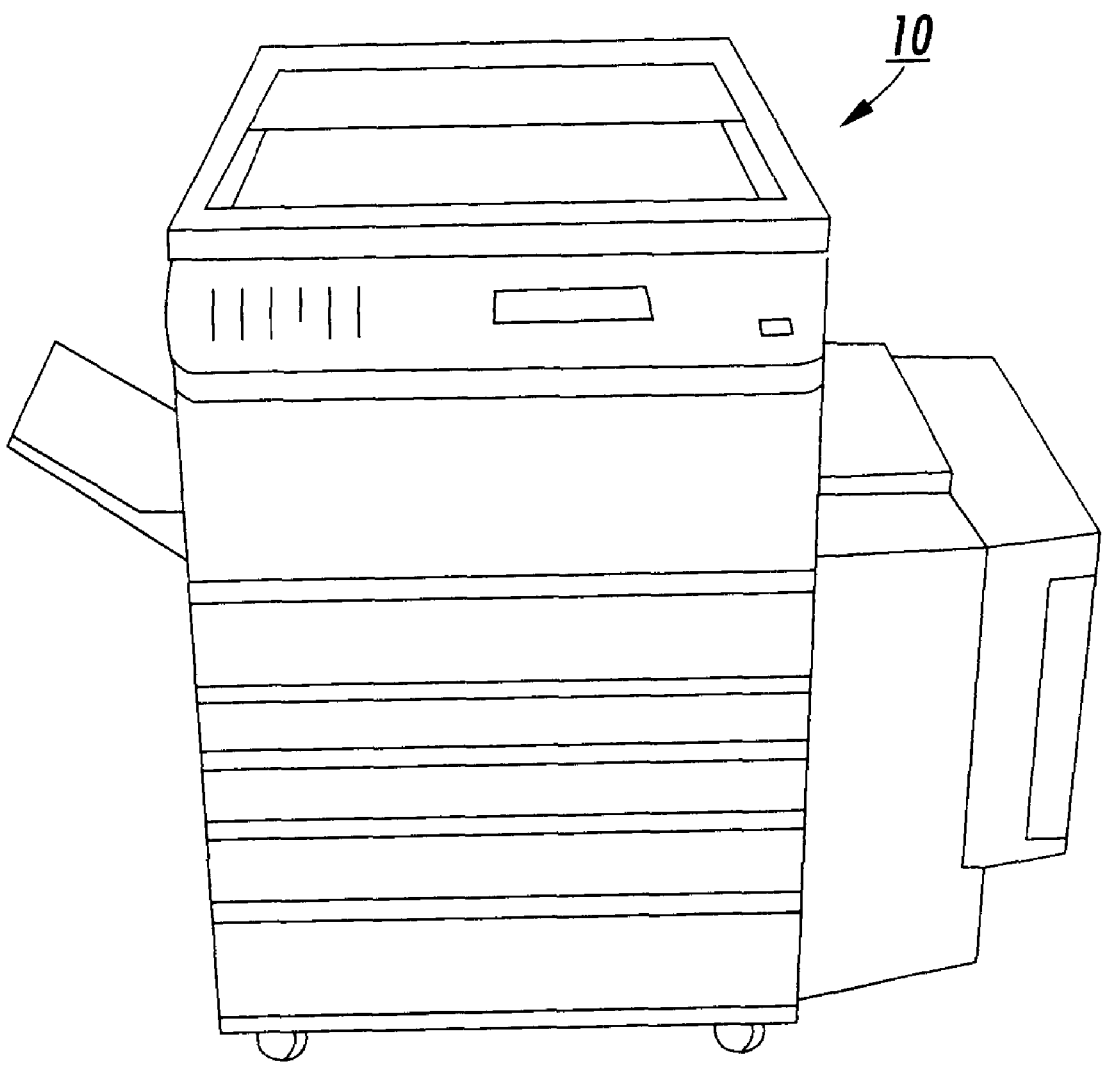
FIG. 1 is a perspective view of a conventional document processing apparatus.
Figure 2:
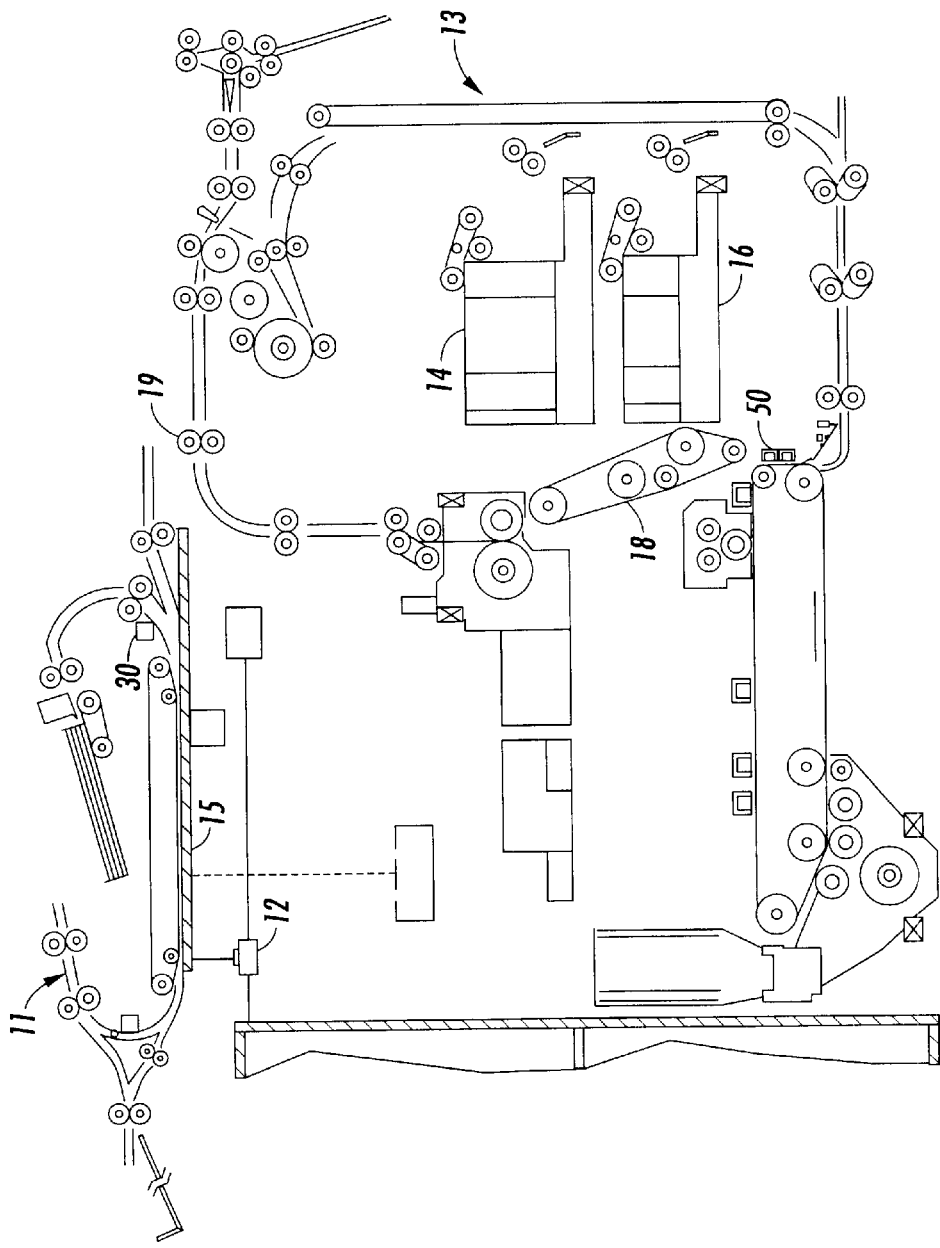
FIG. 2 is a schematic view of paper paths and belts within the document processing apparatus shown in FIG. 1.
Figure 3:
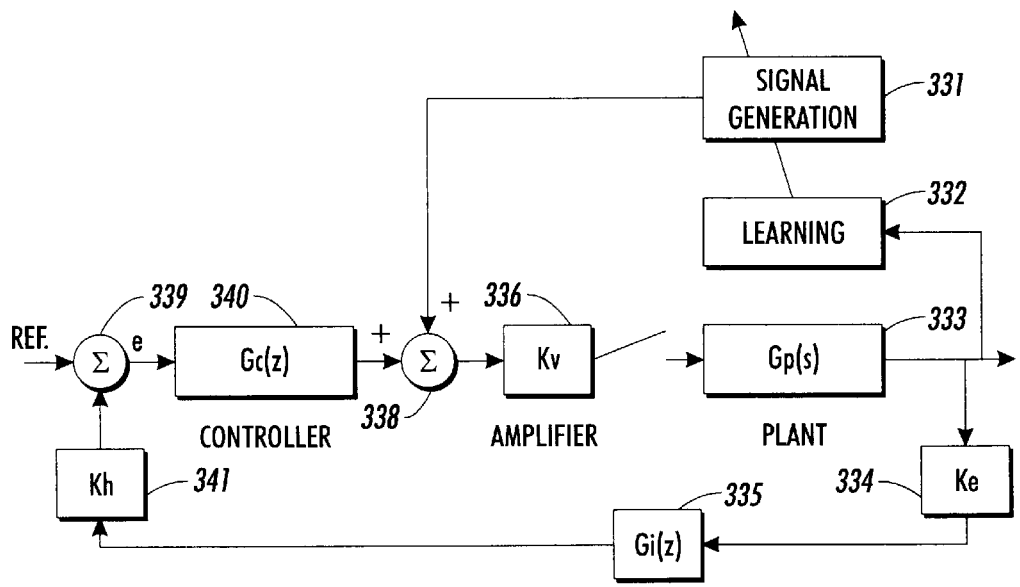
FIG. 3 is a block diagram of a hybrid learning control system incorporating features of the present invention for controlling belts shown in FIG. 2.

Although the present invention will be described with reference to the single embodiment shown in the drawings, it should be understood that the present invention can be embodied in many alternate forms of embodiments. Referring to FIG. 1, there is shown a perspective view of a document processing apparatus 10. The apparatus 10 could be any suitable type of document processing apparatus, such as a copier, a facsimile machine, a scanner, a computer printer, or a multifunction device having two or more functions. Referring also to FIG. 2, in this embodiment the apparatus 10 is a copier which includes an original document feed system 11 and a copy document feed system 13. A scanner or image obtainer 12 is provided under a transparent glass platen 15. The scanned information from an original document fed through the original document feed system 13 is imaged onto paper selected from paper trays 14 or 16. Paper selected from either of the paper trays 14,16 is moved by the copy document feed system 13 through the apparatus 10 by means of various intermediate belt transfers 18 and rollers 19 schematically depicted in FIG. 2. The original document feed system 11 also comprises suitable belts and rollers for automatically moving original documents through the document system. Referring now to FIG. 3 there is shown a block diagram of a hybrid learning control system, incorporating features of the present invention, generally intended to be used for controlling document transport systems in a document processing apparatus such as described above with reference to FIGS. 1 and 2 (e.g.: a copier, a facsimile machine, a computer printer, a scanner, or a multifunction device). The hybrid controller consists of a controller 340, a feedback path consisting of feedback gain devices 334, another feedback gain device 341 and feedback transfer element 335; a learning feedback system consisting of a learning feedback element 332 and learning feedback signal generator 331. In addition, the hybrid controller consists of summing nodes 339,338 and amplifier 336.

The controller 340 controls the velocity of IBT (intermediate belt transfer) belts, photoreceptor drums, etc., while the learning controller 332 corrects for the non-linear motion. The combination of the controller 340 with the learning controller 332 provides precise registration between the original image and the surface receiving the reproduced image. Precise registration prevents the appearance of defects (e.g., a border between two colors not present in the original image) caused by slight misalignment of the marking element with respect to the corresponding area of the image receiving surface (e.g., a photoreceptor or a marking medium) at the time of the reproduced image is transferred. The learning controller 332 corrects for the non-linear motion by setting the signal generator 331 to add a sinusoidal signal of equal magnitude and substantially opposite phase for every error frequency to be corrected to summing node 338.

Figure 4:
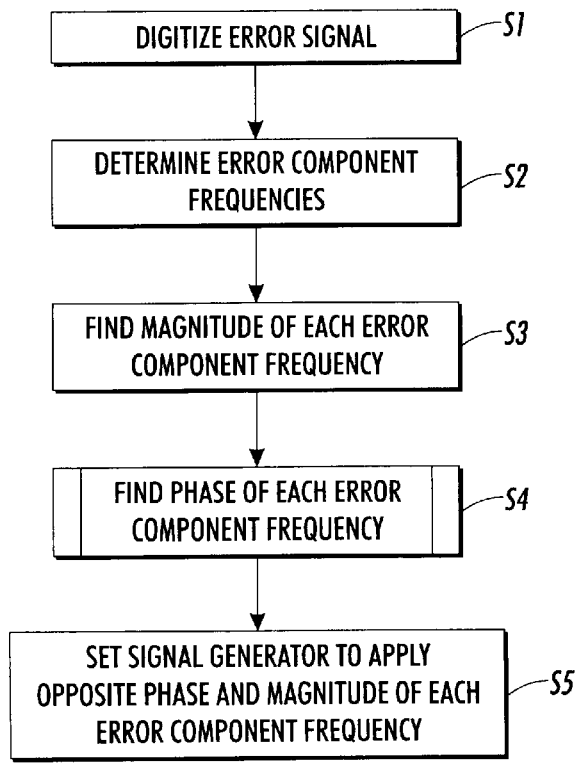
FIG. 4 is a flowchart of one method for learning the phase and amplitude of the sinusoidal signals to be applied to correct for non-linear motion using the hybrid system shown in FIG. 3.

Referring now to FIG. 4 there is shown a flowchart of one method for learning the phase and amplitude of the sinusoidal signals to be applied to correct for non-linear motion of the controlled plant (FIG. 3, item 333). The learning device (FIG. 3, item 332) digitizes S1 the output signal of the controlled plant (FIG. 3, item 333) and determines S2 each of the error component frequencies. The voltage magnitude of the correcting signal is found by dividing the velocity variation of each error component frequency by the transfer function of the velocity/voltage. The transfer function of velocity/voltage vs. frequency can be obtained analytically or experimentally and are determined S3 through well known techniques and is not discussed here. The phase of each error component frequency is determined S4 and is explained in more detail below. Once the phase and amplitude is known the signal generator (FIG. 3, item 331) is set S5 to apply a sinusoidal signal equal in magnitude and substantially opposite in phase for each error component frequency.

Figure 5:
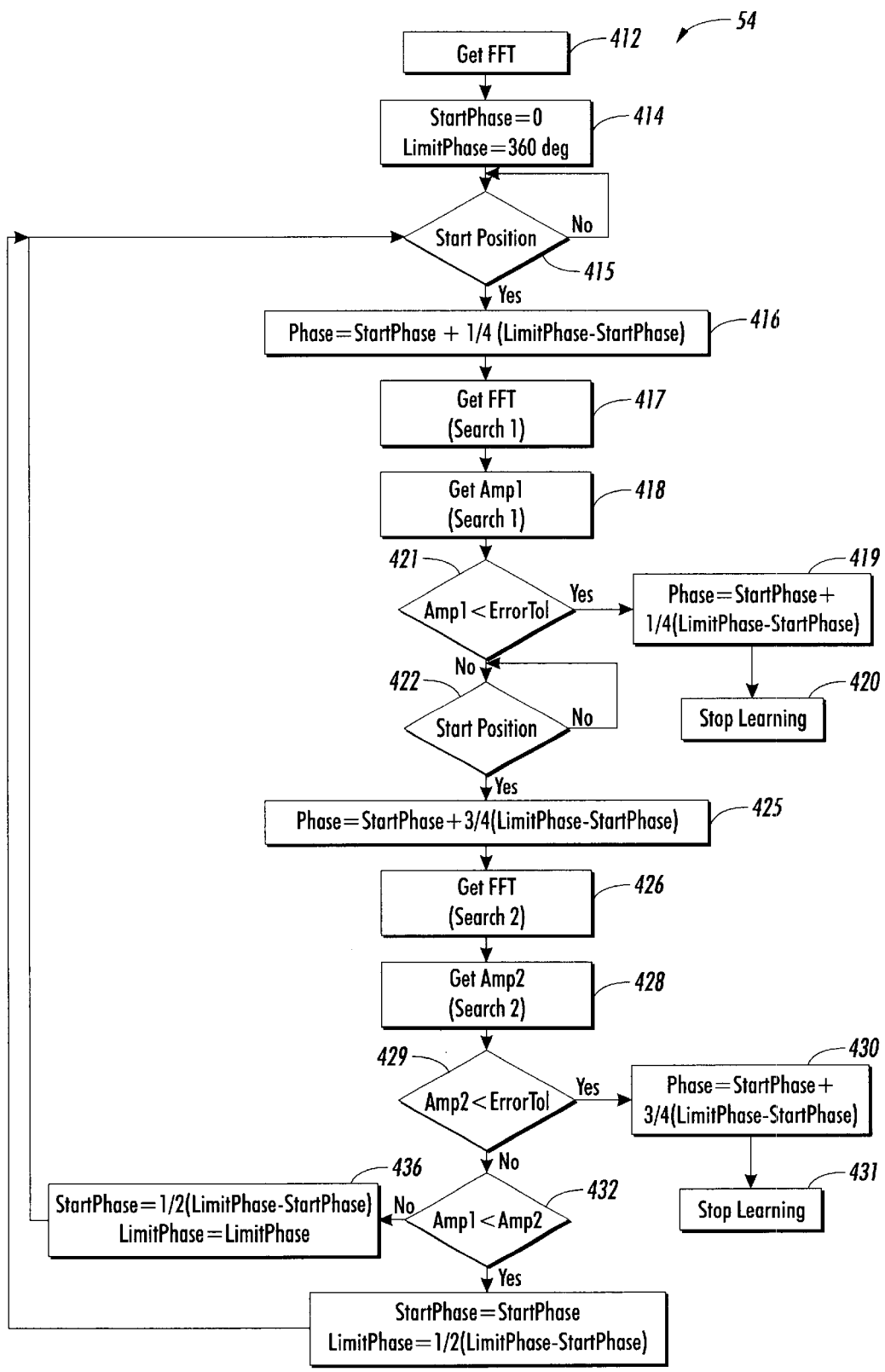
FIG. 5 is a detailed flowchart of one method for finding the phase of each error component frequency shown in FIG. 4.

Referring now to FIG. 5 there is shown a detailed flowchart of one method for learning (FIG. 4, item 54) the phase of the sinusoidal signals to correct for non-linear motion using the hybrid system shown in FIG. 3. The plant (FIG. 3, item 333) output performance (i.e., belt speed) is discreetly sampled 412 at a constant interval, digitizing and transforming the sample signal from the time domain to the frequency domain. Generally, the sampled error signal is sampled 412 at a rate compatible with a Fast Fourier Transform (FFT) implementation. The phase of the error signal is synchronous to the position of the part that generates the error, this means that the phase of each error signal is referenced from the start of each revolution. Accordingly, to determine the phase of the error signal the start-phase variable is initially set to zero degrees 414 while the limit-phase variable is set to 360 degrees 414. Next, a decision operation determines 415 the start position of the part being controlled and the signal generator (FIG. 3, item 331) applies 416 a sinusoid equal in magnitude at a phase equal to the following:

Phase=start-phase+¼((limit-phase)−(start-phase)).

The plant (FIG. 3, item 333) output performance (i.e., belt speed) is again discreetly sampled 417 at a constant interval, digitizing and transforming the sample signal from the time domain to the frequency domain. The velocity variation amplitude of the frequency of interest is determined 418 and a decision operation 421 compares the velocity variation amplitude of the frequency of interest to a specified error tolerance. If the result of the decision operation 421 is less than the specified error tolerance the phase for the error frequency is set 419 to:

Phase=start-phase+¼((limit-phase)−(start-phase)), and learning stops 420. If the result of the decision operation 421 is not less than the specified error tolerance a decision operation again determines 422 the start position of the part being controlled; the signal generator (FIG. 3, item 331) applies 425 the sinusoid equal in magnitude at a phase equal to the following:

Phase=start-phase+¾((limit-phase)−(start-phase)).

The plant (FIG. 3, item 333) output performance (i.e., belt speed) is again discreetly sampled 426 at a constant interval, digitizing and transforming the sample signal from the time domain to the frequency domain. The velocity variation amplitude of the frequency of interest is determined 428 and a decision operation 429 compares the velocity variation amplitude of the frequency of interest to a specified error tolerance. If the result of the decision operation 429 is less than the specified error tolerance the phase for the error frequency is set 430 to:

Phase=start-phase+¾((limit-phase)−(start-phase)), and learning stops 420. If the result of the decision operation 421 is not less than the specified error tolerance a decision operation determines 432 if the velocity variation amplitude determined by step 418 is less than the velocity variation amplitude determined by step 428. An affirmative determination results in setting 432 the start-phase variable to the last known value of the start phase variable and setting 432 the limit-phase variable to:

Limit-phase=½((limit-phase)−(start-phase)).

A negative determination by decision operation 432 results in setting 436 the limit-phase variable to the last known value of the limit-phase variable and setting 436 the start-phase variable to:

Start-phase=½((limit-phase)−(start-phase)).

The steps are then repeated until a decision operation, 421 or 429, determines the velocity variation amplitude of the frequency of interest is less than a specified error tolerance and learning stops, 420 or 431.

In test, mathematical models simulated gears and roll run-out. In one test the center was set to 0.1 mm off-center, resulting in velocity changes of about 1.814 mm/sec (zero to peak) or 0.565% of ΔV/V. Typical motion quality for applications affecting the image formation in printers requires that %ΔV/V velocity be less than 0.1%. After learning the %ΔV/V was reduced to 0.00291%.

Figure 6A:
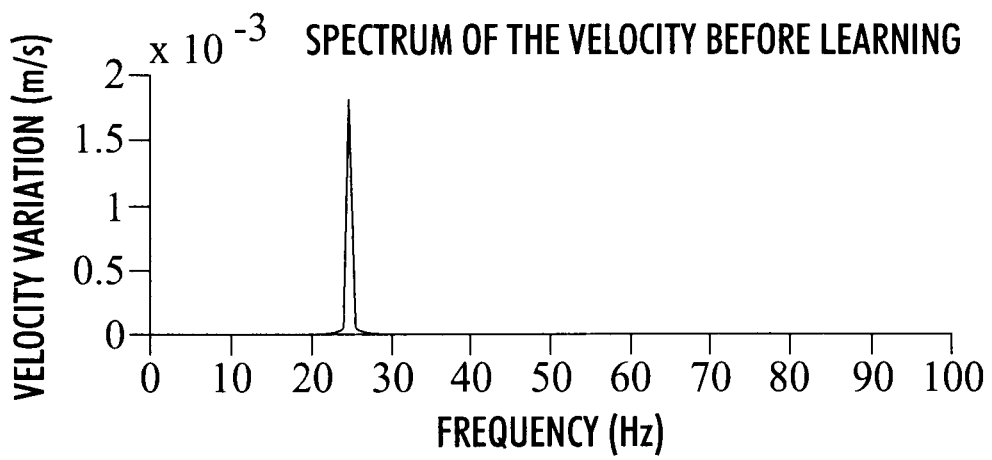
FIG. 6a is a frequency domain graph showing belt velocity variation before learning and applying the phase and amplitude of the sinusoidal signals as shown in FIG. 4.
Figure 6B:
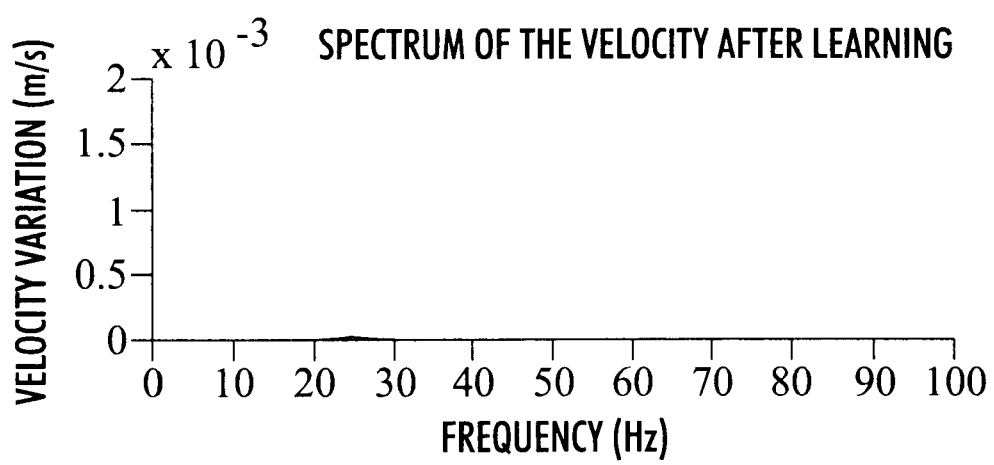
FIG. 6b is a frequency domain graph showing belt velocity variation after learning and applying the phase and amplitude of the sinusoidal signals as shown in FIG. 4.
Figure 8:
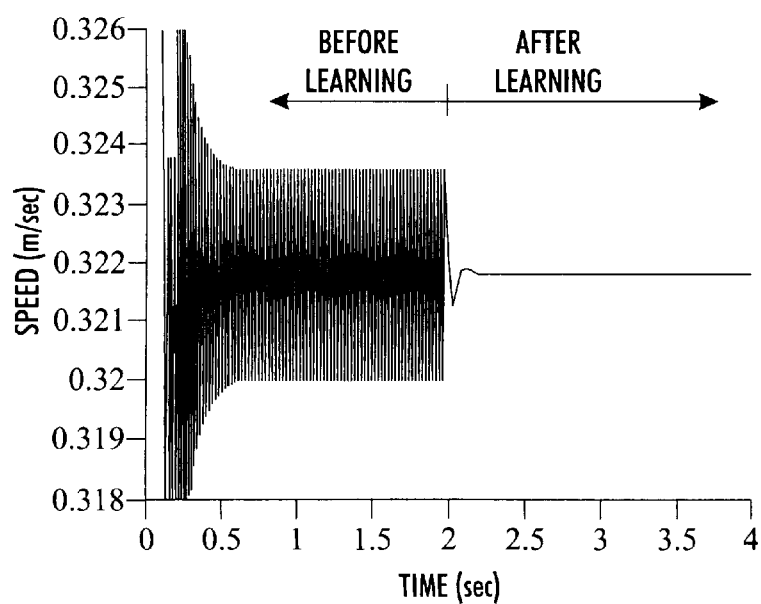
FIG. 8 is a comparison graph showing belt speed variation before and after learning the phase and amplitude of the sinusoidal signals as shown in FIG. 4.

Referring to FIG. 8 there is shown a comparison graph showing the belt speed variation before and after learning the phase and amplitude of the sinusoidal signals according to the steps shown in FIGS. 3 and 4. Referring to FIG. 6a there is shown a frequency graph showing belt velocity variation before learning and applying the phase and amplitude of the sinusoidal signals as shown in FIG. 4. Referring to FIG. 6b there is shown a frequency graph showing belt velocity variation after learning and applying the phase and amplitude of the sinusoidal signals as shown in FIG. 4.

Figure 7:
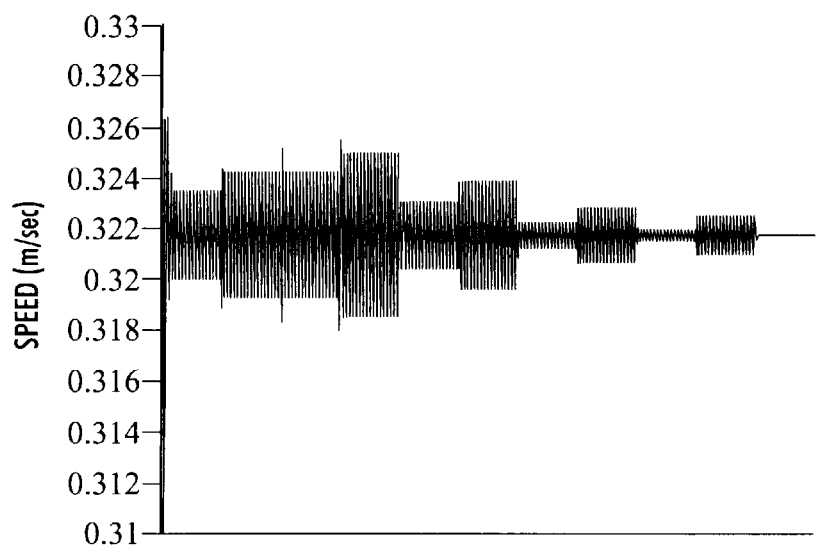
FIG. 7 is a progression graph showing the velocity variation while the algorithm shown in FIG. 4 is finding the minimum velocity variation.

Referring now to FIG. 7 there is shown a progression graph showing the belt speed and velocity variation while the algorithm shown in FIG. 4 is finding the minimum velocity variation. It is readily appreciated from FIG. 7 that learning in a particular system is done once, unless one of the parts is replaced. For example, if a motor is replaced, the magnitude and phase of the correction signal should be learned again. It is also readily appreciated from the descriptions above that the disadvantages of the prior art are overcome by the present invention. Specifically, the invention allows manufacturing tolerance requirements such as pinion run-out tolerances to be relaxed by dynamically compensating non-linear motion induced by finite tolerance.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hybrid learning feedback controller (HLC) system for controlling operation of a xerographic imaging device, the xerographic device having an input port and an output port, the HLC feedback controller system comprising:
   a feed forward controller system operative to receive an actuating signal and in response to the actuating signal output a manipulated variable, the feed forward controller system comprising:
   a feed forward controller;
   a first input summing node connected to the feed forward controller, the first input. summing node operative for summing a reference input and a first feedback signal;
   a second input summing node connected to the feed forward controller, the second input summing node operative for summing the manipulated variable and a second feedback signal;
   a first proportionality device serially connected to the second input summing node and the input port of the xerographic imaging device;
   a first feedback compensator connected to the controller; and
   a second feedback compensator connectable to the controller, the second feedback compensator having a learning controller system for correcting non-linear motion of the device;
   wherein the second feedback compensator comprises:
      a sampling device; and
      a signal generator connected to the sampling device, the signal generator operative to produce the second feedback signal,
      wherein sampling device comprises:
         fast Fourier transform (FFT) device;
         a magnitude detector connected to the FFT device; and
         a phase comparator connected to the magnitude detector.

2. A HLC system as in claim 1 wherein the first feedback compensator comprises:
   a second proportionality device connected to the output port of the xerographic imaging device;
   a first feedback element connected to the second proportionality device, the first feedback element operative to produce an intermediate feedback signal; and
   a third proportionality device connected to the first feedback element, the third proportionality device operative to produce the first feedback signal.

* * * * *